United States Patent [19]

Koda et al.

[11] 4,241,365
[45] Dec. 23, 1980

[54] MAGNETIC VIDEO RECORDING AND REPRODUCING DEVICE

[75] Inventors: Minoru Koda, Hirakata; Tsuneo Muya, Osaka, both of Japan

[73] Assignee: Matsushita Electric Industrial Co., Ltd., Osaka, Japan

[21] Appl. No.: 936,189

[22] Filed: Aug. 22, 1978

Related U.S. Application Data

[63] Continuation of Ser. No. 734,809, Oct. 22, 1976, abandoned.

[30] Foreign Application Priority Data

Oct. 31, 1975 [JP] Japan ............................... 50-131587

[51] Int. Cl.² .......................................... G11B 15/28
[52] U.S. Cl. .......................................... 360/73; 360/10
[58] Field of Search ...................... 360/70, 73, 75, 77, 360/10, 11; 318/314, 318, 685, 696

[56] References Cited

U.S. PATENT DOCUMENTS

| | | | |
|---|---|---|---|
| 3,557,320 | 1/1971 | Hopf | 360/10 |
| 3,668,492 | 6/1972 | Konishi | 360/73 |
| 3,691,314 | 9/1972 | De Bell | 360/73 |
| 3,699,247 | 10/1972 | Mashima | 360/10 |
| 3,736,488 | 5/1973 | Abraham | 318/696 |
| 3,921,132 | 11/1975 | Baldwin | 360/33 |
| 3,931,639 | 1/1976 | Arter | 360/70 |
| 3,943,562 | 3/1976 | Opelt | 360/10 |
| 3,959,818 | 5/1976 | Iketaki | 360/70 |
| 4,001,885 | 1/1977 | Ikushima | 360/70 |
| 4,032,982 | 6/1977 | Arter | 360/74 |

Primary Examiner—John H. Wolff
Assistant Examiner—Alan Faber
Attorney, Agent, or Firm—Wenderoth, Lind & Ponack

[57] ABSTRACT

In a magnetic recording and reproducing device for recording a video signal intermittently by a rotary magnetic head, a capstan motor is rotated by $\alpha$ or $\alpha/\beta$ pulses applied to a pulse generator for moving a magnetic tape exactly a length for one track or $1/\beta$ of that length, $\alpha$ being a positive integer other than a prime number and $\beta$ being a positive integer other than 1, so the head can scan just one track correctly.

5 Claims, 29 Drawing Figures

MAGNETIC VIDEO RECORDING AND REPRODUCING DEVICE

This application is a continuation application of Ser. No. 734,809, filed Oct. 22, 1976, now abandoned.

BACKGROUND OF THE INVENTION

This invention relates to a magnetic recording and reproducing device, and more particularly to a magnetic recording and reproducing device for recording video signals intermittently on a magnetic tape by rotary heads at various tape moving speeds and reproducing the recorded video signal of one frame by moving the tape a distance corresponding to the length of tape on which one track is recorded, hereinafter referred to as the length corresponding to one track, and stopping it.

Usually, a magnetic recording and reproducing device for recording a video signal, which is taken out at every n fields (n being an integer), intermittently on a magnetic tape moving at a speed of 1/n of the standard speed is used mainly for monitoring and observation, and the intermittently recorded video signal is reproduced in a moving image continuously by moving the magnetic tape at the standard speed. Further, at a special position a still image is reproduced by stopping the movement of the magnetic tape. In the latter case, when the magnetic tape is moved correctly a length corresponding to one intermittent magnetic track for reproducing a still image of a single frame, the device becomes very usable.

However, the conventional device has various defects such as difficulty of moving the magnetic tape correctly just the length of one track, deviation of the track during reproducing due to inertia of a tape reel, over tension imposed on the tape, etc.

SUMMARY OF THE INVENTION

Therefore, an object of the present invention is to provide a novel and improved magnetic recording and reproducing device in which a video signal, which is recorded intermittently on a magnetic tape, is reproduced as a still image by moving the magnetic tape exactly the length for one track or an integral fraction of one track by a novel tape driving system.

Another object of this invention is to provide a magnetic recording and reproducing device by which the adjustment of the position of the video signals to be reproduced, relative to the position of the rotary magnetic head, can be easily achieved, so that the rotary magnetic head can be easily tuned to the ON-tracks of the video signals.

Another object of the present invention is to provide such a novel tape driving system by which the magnetic tape can be moved exactly the length for one track without over tension.

A further object of the present invention is to provide such a novel tape driving system which holds the tape securely in the stopped position while reproducing the still image and does not cause deviation of the track.

A further object of the present invention is to provide a novel circuit configuration for such a novel tape driving system for overcoming the conventional defects as described above.

These objects are achieved by providing a magnetic recording and reproducing device according to the present invention, which comprises a motor for moving said magnetic tape, driving means for driving said motor, pulse supplying means for supplying pulses to said driving means, pulse counting means for counting the number of pulses to be applied to said pulse supply means, a first pulse generating means for generating pulses to be applied to said pulse supplying means, and a first gating means connected between said first pulse generating means and said pulse supplying means, wherein the number of pulses to be applied to said pulse supplying means for rotating said motor through a rotation angle corresponding to the length of the magnetic tape for one oblique magnetic track is set at $\alpha$ ($\alpha$ is a positive integer other than a prime number), and said first gating means is opened only for a time in which said $\alpha$ pulses are counted by said pulse counting means so as to move said magnetic tape a length corresponding to just one track.

BRIEF DESCRIPTION OF THE DRAWINGS

These and other objects and the features of the present invention will be apparent from a consideration of the following description of a preferred embodiment together with the accompanying drawings in which.

DETAILED DESCRIPTION OF A PREFERRED EMBODIMENT

Figure 1:
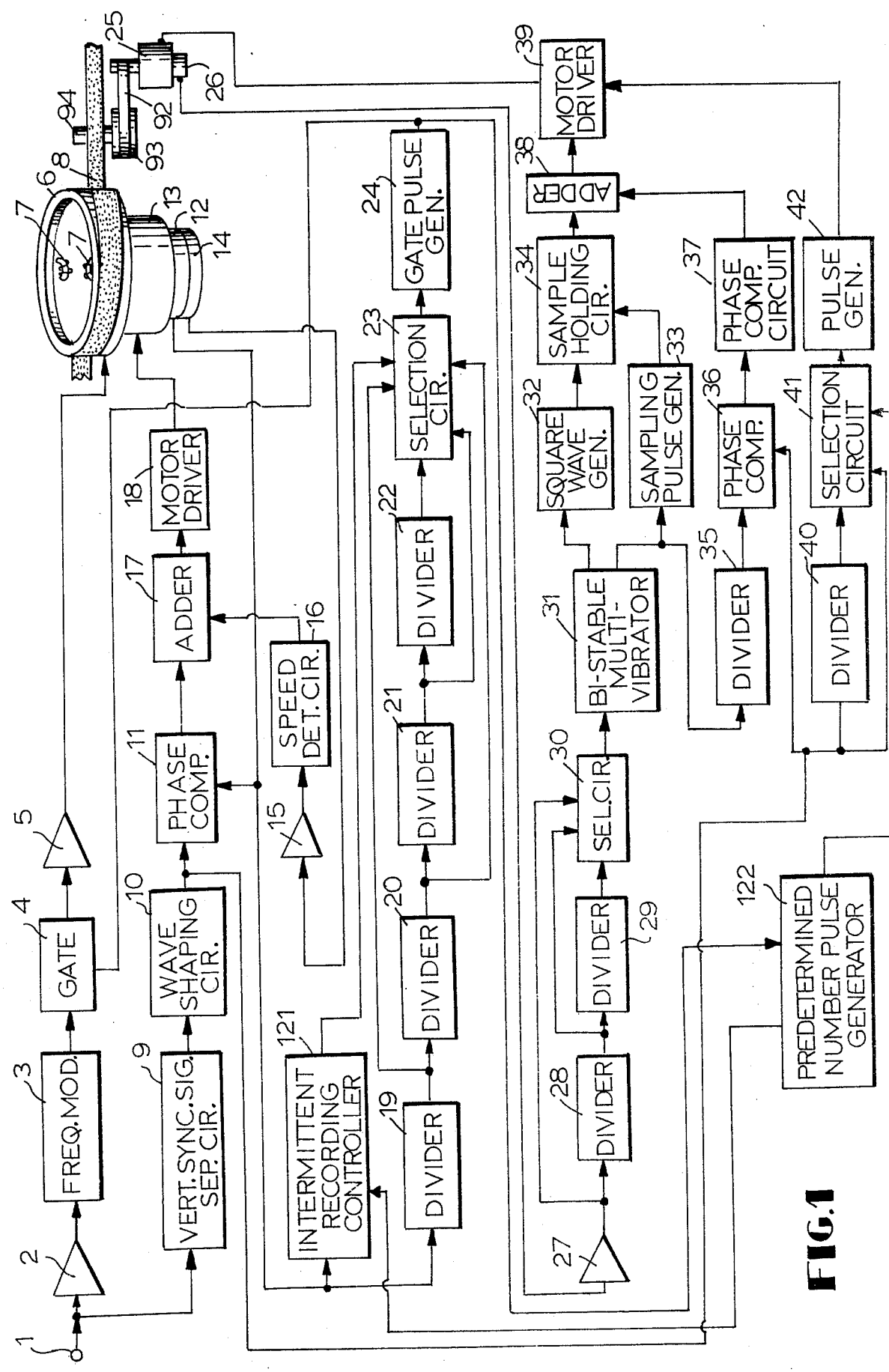
FIG. 1 is a block diagram of an embodiment of a magnetic recording device according to the present invention.

The present invention is applicable to a standard I-type magnetic recording and reproducing device using two rotary magnetic heads. In such a standard video tape recorder, the usual magnetic tape moving speed is set at 19.05 cm/sec (EIAJ Standard: Electric Industry Association of Japan). The magnetic tape moving speed for recording the video signal intermittently is set, for example, at 1/9, 1/18, 1/36 or 1/72 of the above mentioned usual speed of 19.05 cm/sec, respectively. A video signal for about one field is picked out at every 9, 18, 36 or 72 fields corresponding to the above mentioned reduced speeds and recorded on the magnetic tape.

As the tape moving speed at the time of recording by forming magnetic tracks on the tape intermittently is slow as described above, the inclination of the track to the tape moving direction becomes very near the scanning inclination of the rotary head when the tape is stopped. Therefore, when the tape is stopped, the rotary head scans the tape nearly parallel with the tracks formed thereon intermittently.

However, when the tape is stopped, the rotary head does not always correctly scan only one track. Sometimes, the head deviates from the track or it reproduces the signals of two tracks at the same time. This causes degradation of the quality of the reproduced image such as a decrease of S/N ratio and occurance of beat noise due to a frequency-modulated signal in the whole reproduced image. Further, even if the tape is moved a length corresponding to one track, the resultant image is similarly degraded. However, by moving the tape $1/\beta$ ($\beta$ being an integer), such as $\frac{1}{2}$ or $\frac{1}{3}$, of the length of one track, it becomes possible to make the rotary head correctly scan only one track.

Moreover, even when the rotary head correctly scans one track as described above, it sometimes happens that noise is caused in the reproduced image by the process of moving the tape a length corresponding to one track. If such movement of the tape a length corresponding to one track can be performed in a very short time, the time during which the above described reproduced image has much noise therein becomes sufficiently short to be tolerable for practical use. However, when the tape is moved a length corresponding to one track in a very short time, over tension is created in the tape and permanent transformation of length may be caused.

In order to overcome this problem, when moving the tape a length corresponding to one track, the tape should be moved slowly at first and then the speed should be increased gradually and then the speed should be reduced again. With such movement of the tape, undesirable force is not exerted on the tape, and with respect to the reproduced image having beat noise as described above, which is caused when the rotary head scans two tracks at the same time, the tape moving speed at this time is fast and so the time during which such an undesirable image is reproduced becomes short.

According to the present invention, a multipole magnetized brushless DC motor is used as a motor for moving the magnetic tape, and it is operated as a conventional brushless DC motor when the tape moving speed is fast and it is driven by separately supplied pulses when the tape moving speed is slow and when the tape is moved a length corresponding to one track or an integral fraction of one track. The number of pulses to be applied to the brushless motor for rotating the motor through a rotation angle necessary for moving the tape a length corresponding to one track is set to be an integral number, and by counting the appointed number of pulses the tape is moved a length corresponding to one track. Therefore, it is necessary that the length of the tape be moved corresponding to one track be the same regardless of the tape moving speed when forming the track during recording of the intermittently picked out video signal. In this case, when there is only one motor for moving the magnetic tape and the tape moving speed can be changed by changing the speed of rotation of the motor, it is possible to neglect the influence of slipping of a mechanism such as belt and capstan for transmitting the rotation of the motor to move the tape.

On the other hand, when moving the tape a length corresponding to one track and providing a reproduced image of one frame, it is required that the tape not be moved, e.g. by the rotation of a rewinding reel after the tape has been moved the appointed length. For this purpose, even when the motor is stopped, a torque for maintaining the stopped state is required. Therefore, it is required that the speed of rotation of the motor for moving the magnetic tape can be exactly controlled over a wide range of speeds and that the motor have a certain holding torque even when the motor is stopped. For this reason, according to the present invention, one brushless motor is employed which has two rotation states, one in which it is a conventional brushless DC motor and the other in which it is driven by separately supplied pulses.

An embodiment of the invention will be described in more detail hereinafter with reference to the drawings. In the device shown in the block diagram of FIG. 1, a video signal applied to an input terminal designated by a reference numeral 1 is amplified by an amplifier 2 and applied to a frequency modulator 3. The output signal of the frequency modulator 3 is taken out for a time slightly longer than that for one field by a gate circuit 4 and applied to a recording amplifier 5. The signal amplified by the amplifier 5 is supplied to magnetic heads 7 and 7' mounted on a drum 6 and is recorded on a magnetic tape 8 wound around about a half of the circumference of the drum 6.

The video signal at the input terminal 1 is also applied to a vertical synchronizing signal separating circuit 9 where the vertical synchronizing signal is extracted from the video signal. The separated vertical synchronizing signal is wave-shaped by a wave-shaping circuit 10 and applied to a phase comparator 11. On the other hand, a rotation phase detector 12 generates one pulse at each one rotation of the rotary heads 7 and 7', and this pulse is also applied to the phase comparator 11. Thus, any phase difference between the rotation phase of the rotary heads 7 and 7' and the vertical synchronizing signal of the video signal applied to the input terminal 1 is detected.

The rotary heads 7 and 7' are rotated by a motor 13 mounted below the drum 6. A rotation speed detector 14 mounted on the motor 13 generates a signal having a frequency corresponding to the speed of rotation of the motor 13, and that signal is amplified by an amplifier 15 and applied to a speed detecting circuit 16, which converts the frequency corresponding to the speed of rotation of the motor 13 into a voltage. The output of the phase comparator 11 and the output of the speed detecting circuit 16 are applied to an adder 17, and the output signal thereof is applied to a motor driver 18, which provides driving power to the motor 13. Accordingly, the rotary heads 7 and 7' are rotated synchronously with the vertical synchronizing signal of the video signal applied to the input terminal 1.

Figure 8:
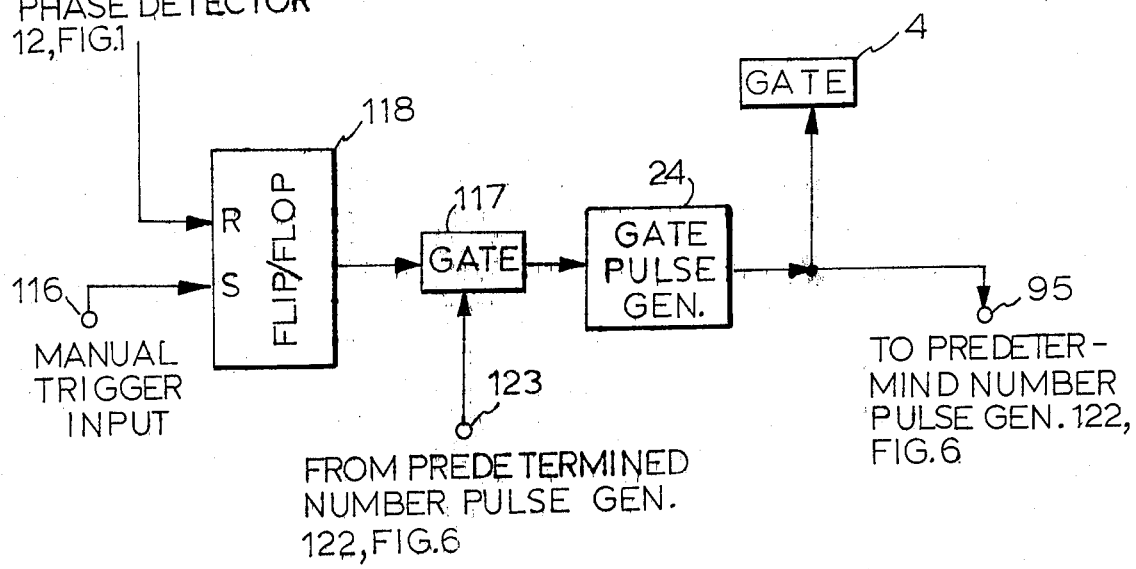
FIG. 8 is a block diagram of a circuit for recording a video signal at a desired time by forming tracks at the same interval.

The output of the rotation phase detector 12 is also applied to a first divider 19, the output of which is applied to a second divider 20. In turn, the output of the divider 20 is applied to a third divider 21, and the output of the latter is applied to a fourth divider 22. The outputs of each of the dividers 19, 20, 21 and 22 is also applied to a manually settable selection circuit 23. The output of intermittent recording controller 121, whose operation is explained in detail below with reference to FIG. 8, is also applied to selection circuit 23. The output of selection circuit 23 is applied to a gate pulse generator 24. The gate pulse generator 24 is connected to the gate circuit 4 and controls the gating time thereof. The frequency dividing ratios of the first to the fourth dividers 19, 20, 21 and 22 are selected according to the time necessary for recording the video signal intermittently on the tape 8. In the case when a video signal of about one field is recorded every 9, 18, 36 or 72 fields as described hereinbefore, when the frequency of the output pulse from the rotation phase detector 12 is the same as the field frequency of the video signal, the dividing ratio of the divider 19 is 1/9 and that of the other dividers 20, 21 and 22 is ½. These dividing ratios obtained at the selection circuit 23 correspond to the reduction ratios of a capstan motor described hereinafter.

The magnetic tape 8 is moved by a capstan motor 25, and a frequency generator 26 for generating a frequency corresponding to the rotation speed of the motor 25 is mounted on the motor 25. The output of the generator 26 is amplified by an amplifier 27, and the output thereof is applied to a first divider 28 for changing the rotation speed of the capstan motor 25. In turn, the output of the first divider 28 is applied to a second divider 29. Each of the outputs of these dividers 28 and 29 is also applied to a manually settable selection circuit 30. Selection circuit 30 selects one of its inputs for application to a bi-stable multivibrator 31. The first output of the bi-stable multivibrator 31 triggers a square wave generator 32, and the second output thereof is applied to a sampling pulse generator 33. The pulse from the sampling pulse generator 33 is applied to a sample holding circuit 34 for sampling the square wave from the square wave generator 32. According to the configuration described above, when the speed of rotation of the capstan motor 25 changes, the frequency of the frequency generator 26 changes, and so the period of the bi-stable multivibrator 31 changes and then there is provided a voltage change corresponding to the above change of the period at the sample holding circuit 34.

On the other hand, the second output of the bi-stable multivibrator 31 is also applied to a divider 35. The dividing ratio of the divider 35 is set so that the output frequency thereof is the same as or n times or 1/n of the frequency of the vertical synchronizing signal of the video signal (n being an integer). The output of the divider 35 and the output of the wave-shaping circuit 10 are applied to a phase comparator 36, where the rotation phase of the capstan motor 25 is compared with the phase of the vertical synchronizing signal of the video signal applied to the input terminal 1. Any phase error voltage from the phase comparator 36 is applied to an adder 38 through a phase compensating circuit 37. On the other hand, any speed error signal from the sample holding circuit 34 is also applied to the adder 38. The output of the adder 38 is applied to a capstan motor driver circuit 39 which is described in detail hereinafter, and power for rotating the motor 25 is provided therefrom to the motor 25.

Figure 6:
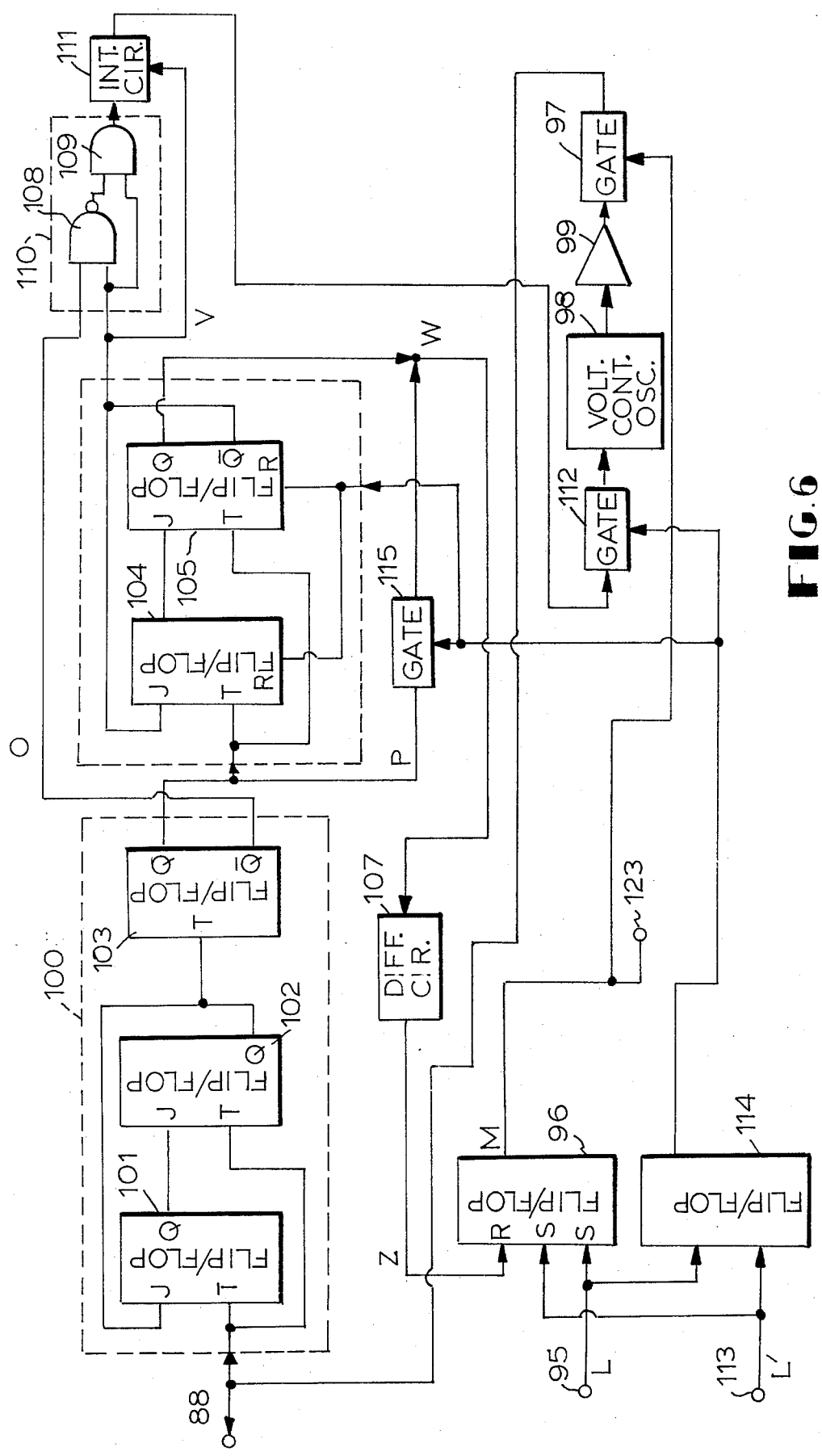
FIG. 6 is a block diagram of a circuit for moving a magnetic tape a length corresponding to one track or an integral fraction of one track according to the invention.

In order to rotate the capstan motor 25 by the separately provided pulses as described hereinbefore, the output of the wave-shaping circuit 10 is applied to a divider 40 and to a manually settable selection circuit 41 and the output of the divider 40 is also applied to the selection circuit 41. The output of predetermined number pulse generator 122, whose operation is explained in detail below with reference to FIG. 6, is applied to selection circuit 41. Selection circuit 41 selects one of its inputs for application to pulse generator 42. The output signal of the selection circuit 41 is applied to a pulse generator 42, and the output of the latter is applied to the capstan motor driving circuit 39. The selection circuits 23, and 30 are manually operated together depending on the speed at which the tape is to be run, and the selection circuit 41 is operated according to the mode of operation of the device, i.e. reproduction of still pictures or continuous pictures. The details of the capstan motor driver circuit 39 and the pulse generator 42 are described hereinafter. Because the other blocks shown in FIG. 1 represent circuits familiar to those skilled in the art, a detailed description of them is omitted.

Figure 2:
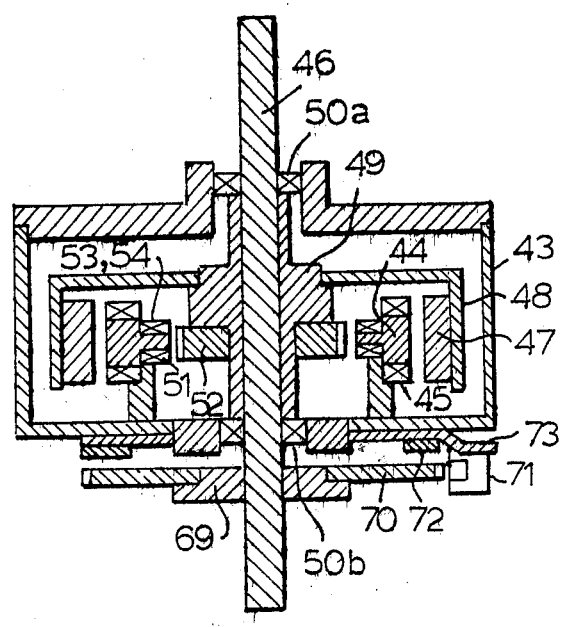
FIG. 2 is a cross sectional view of a capstan motor used for the device of FIG. 1.

FIG. 2 is a cross sectional view of the capstan motor 25, in which a stator of a brushless motor comprises a stator core 44 mounted on a housing 43 and a main winding 45 wound on the stator core 44 in three phases. A ring magnet 47, which is magnetized so as to have 16 poles, is mounted on a rotor 48 so that the inner magnetic pole surface faces the stator core 44. The rotor 48 is attached to a boss 49 which is rotatably mounted on the housing 43 together with a shaft 46 in bearings 50a and 50b at the ends of the boss 49.

On the inside of the stator core 44, there is provided a position detecting stator 51 having three pairs of projections. Facing the position detecting stator 51 is a position detecting rotor 52 for indicating the rotation position of the rotor 48 and which is attached to the boss 49. A group of primary coils 53a, 53b and 53c and a group of secondary coils 54a, 54b and 54c are wound on the position detecting stator 51. In FIG. 2, these coils are designated simply by reference numerals 53 and 54, respectively. On the other hand, on the outer periphery of the position detecting rotor 52, there are provided projections for changing the electro-magnetic coupling between paired primary and secondary coils (53a and 54a, 53b and 54b, 53c and 54c). The number of these projections is small, being half the number of poles of the magnet 47.

Figure 3:
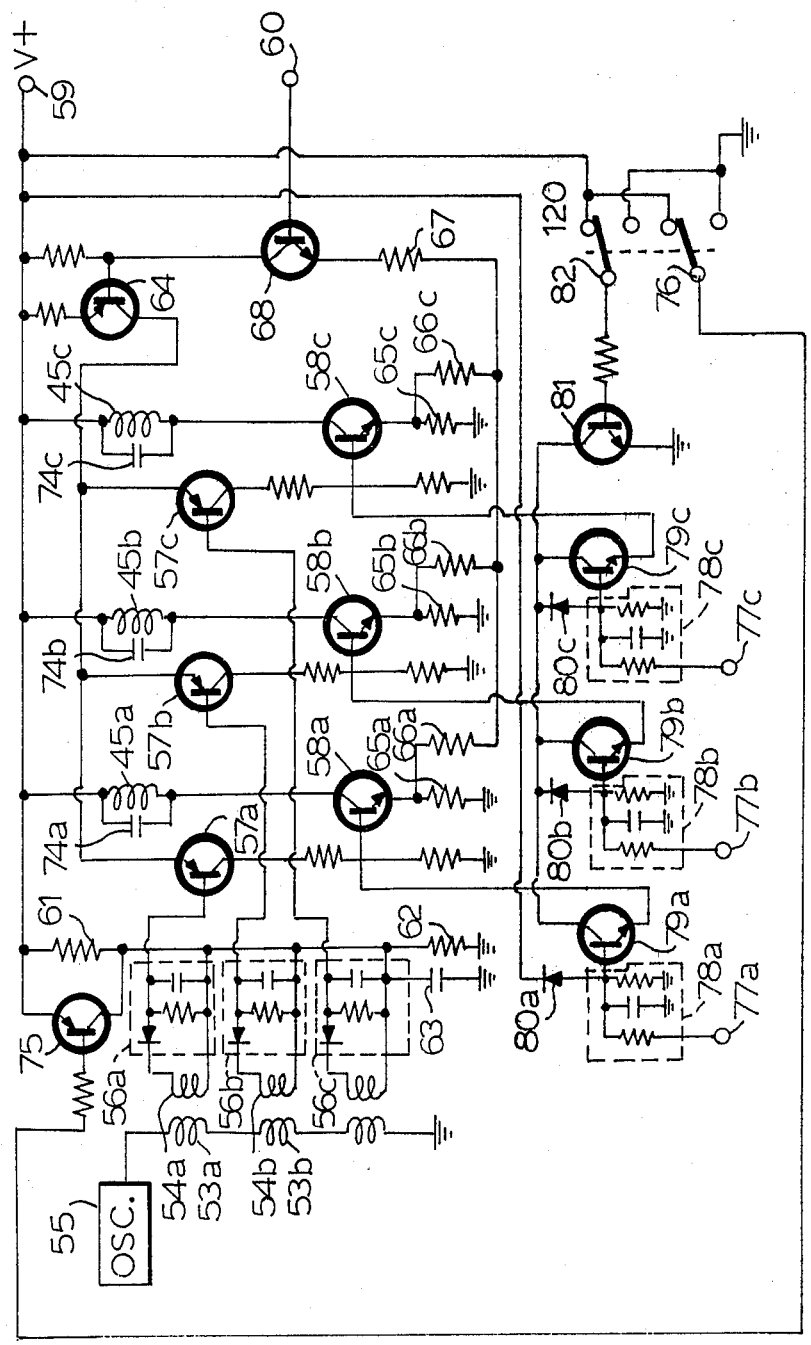
FIG. 3 is a circuit diagram of a motor driver circuit for the capstan motor of FIG. 2.

The motor driver circuit 39 for rotating the capstan motor 25 is shown in FIG. 3, in which when the necessary voltages are applied to power source terminal 59 and control input terminal 60, and an oscillator 55 is operated, an AC signal therefrom is supplied to the group of primary coils 53a, 53b and 53c and transmitted to one of the secondary coils 54a, 54b and 54c through the position detecting rotor 52. Terminal 76 must be connected to the power source by switch 120 to cut off transistor 76, otherwise the bases of transistors 57a, 57b and 57c are reverse biased and no current will flow through the main windings from these transistors. When the position detecting rotor 52 is in a position where it produces an electro-magnetic coupling between the primary coil 53a and the closest secondary coil 54a, a larger AC signal than those induced in the other secondary coils 54b and 54c is induced in the secondary coil 54a, and that AC signal is converted into a DC signal through a rectifying and smoothing circuit 56a and applied to the base of a current switching transistor 57a. Therefore, only the transistor 57a becomes conductive, and so base current is provided to an output transistor 58a and current flows to the main winding 45a of capstan motor 25. When current flows to the main windings 45a as described above, the rotor 48 and the position detecting rotor 52 rotate according to attraction and repulsion caused by that current between the rotor 52 and the magnet 47. Then, the position detecting rotor 52 comes to a position where it produces an electro-magnetic coupling between the primary coil 53b and the secondary coil 54b close thereto, and similarly to the above described action current flows to the main winding 45b of capstan motor 25. In this manner, according to rotation of the rotor 48, the main windings 45a, 45b and 45c of capstan motor 25 to which current flows are energized in turn and the rotor 48 rotates continuously.

As stated above, the necessary voltages must be applied to the power source terminal 59 and the control input terminal 60. The control input terminal 60 is connected to the adder 38 shown in FIG. 1. Rectifying and smoothing circuits 56a, 56b and 56c corresponding to the secondary coils 54a, 54b and 54c, respectively are provided with necessary bias voltage by bias resistors 61 and 62. A bypass capacitor 63 is connected in parallel with the bias resistor 62. The current switching transistors 57a, 57b and 57c are connected in common at their emitters to a constant current transistor 64 so as to hold the other two transistors in the cut off state when one transistor is in a saturation state. The currents flowing through the output transistors 58a, 58b and 58c are provided out in the form of voltage by emitter resistors 65a, 65b and 65c. Feedback resistors 66a, 66b and 66c are also connected to the respective emitters of the output transistors 58a, 58b and 58c in order to decrease the deviation of the current amplification factor of these transistors and to determine the transfer conductance of the capstan motor driving circuit, i.e. the ratio of a change of the current flowing to the main windings 45a, 45b and 45c against a change of voltage applied to the control input terminal 60, by the value of the resistor, and these resistors are connected to the emitter of a control transistor 68 through a resistor 67.

Now, referred to FIG. 2 again, the frequency generator 26 is mounted on the capstan motor 25 so as to generate a frequency proportional to the rotation speed of the motor, as described hereinbefore. A gear 70 is mounted on the rotating shaft 46 by a boss 69, and an angle bar 73 is attached to the housing 43. In order to provide an AC signal corresponding to the number of the gear teeth, a magnetic head 71 and a ring magnet 72 are mounted on the angle bar 73. By this structure, the speed of rotation of the capstan motor 25 is detected, and it is rotated continuously under control by the electric circuit. Because the ring magnet 47 is magnetized so as to have 16 poles and the position detecting rotor 52 has 8 projections, as described hereinbefore, current flows to each of the main windings 45a, 45b and 45c eight times during one rotation of the capstan motor 25.

In FIG. 3, capacitors 74a, 74b and 74c are connected in parallel to the main windings 45a, 45b and 45c, respectively so as to prevent the occurrence of a spike voltage. For stopping operation of the continuous rotation of the capstan motor 25, there is provided a transistor 75 and the collector and emitter thereof are connected across the bias resistor 61. When a terminal 76 is grounded by switch 120, the transistor 75 is saturated and the base of the current switching transistors 57a, 57b and 57c are biased reversely to the emitter. Then, current does not flow to the main windings 45a, 45b and 45c.

Next, will be described the rotating of the capstan motor by separately supplied pulses. In this case, the terminal 76 is grounded by switch 120 and input terminals 77a, 77b and 77c are connected to the pulse generator 42 which is described in detail hereinafter. The input terminals 77a, 77b and 77c are connected to current amplifying transistors 79a, 79b and 79c through integrating circuits 78a, 78b and 78c, respectively, and respective emitters of those transistors are connected to the respective bases of the output transistors 58a, 58b and 58c. In order to prohibit the driving the capstan motor 25 by the separately supplied pulses, there are provided diodes connected to the integrating circuits 78a, 78b and 78c and a transistor 81. When a terminal 82 connected to the base of the transistor 81 is connected to the power source terminal 59 by switch 120, the transistor 81 is saturated and so the current amplifying transistors 79a, 79b and 79c are placed in the cut off state. Thus current amplifying transistors 79a, 79b and 79c operate to provide separately supplied pulses to motor 25 only when terminal 82 is grounded. The conditions when the capstan motor 25 is rotated by the separately supplied pulses is basically the same as the case of a conventional pulse motor, and in the present invention as a method of exciting the main windings 45a, 45b and 45c, 1–2 phase excitation is employed in view of the number of steps of the capstan motor 25 and damping during rotation when driven by the separately supplied pulses. In addition, the state of rotation of the capstan motor 25 can be changed by connecting the terminals 76 and 82 in common to the power source terminal 59 or to ground through switch 120.

There will now be described the operation when pulses are applied to the input terminals 77a, 77b and 77c. As described hereinbefore, the main windings 45a, 45b and 45c are wound in three phases, and so the pulses to be applied to the input terminals 77a, 77b and 77c should have phases which are different from each other by $\frac{2}{3}\pi$ radian. The pulse generator 42 generates such three phase pulses, and an embodiment of such a circuit according to the invention and the waveshapes of the signals therein are shown in FIGS. 4 and 5A–5I, respectively. The pulse generator 42 comprises five J-K flip-flop circuits (hereinafter abbreviated as J-K·FF) 83 to 87.

Figure 4:
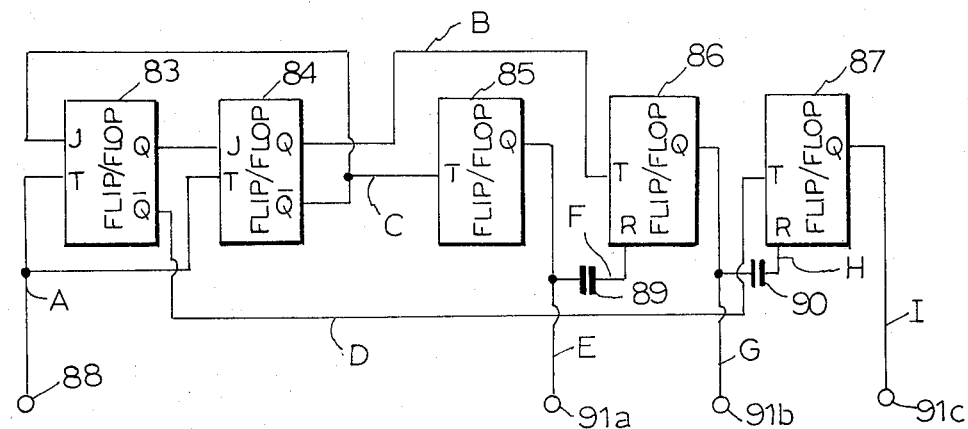
FIG. 4 is a circuit diagram of a three-phase pulse generator for providing pulses to the motor driver circuit of FIG. 3.
Figure 5A:
FIGS. 5A–5I are waveforms of pulses for explaining the operation of the pulse generator of FIG. 4.
Figure 5B:
Figure 5C:
Figure 5D:
Figure 5E:
Figure 5F:
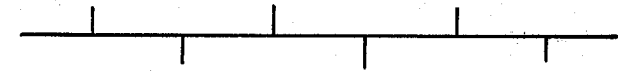
Figure 5G:
Figure 5H:
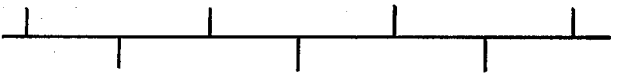
Figure 5I:

When a pulse A as shown in FIG. 5A is applied to an input 88 in FIG. 4 which is connected to the selection circuit 41 in FIG. 1, there are supplied to J-K·FF 83 and 84 which form a ½ divider the following output signals: pulses B, C and D, as shown in FIGS. 5B–5D, for the Q-output of J-K·FF 84, the $\overline{Q}$-output of J-K·FF 84 and the Q-output of J-K·FF 83, respectively. When these pulses B, C and D are applied to each input T of J-K·FF 85, 86 and 87, pulse E as shown in FIG. 5E is provided at the Q-output of J-K·FF 85. By applying the pulse E to a reset terminal R of J-K·FF 86 through a capacitor 89 so as to give it a waveshape of F as shown in FIG. 5F, pulse G as shown in FIG. 5G is provided at the Q-output of J-K·FF 86. Further, by applying this pulse G to a reset terminal R of J-K·FF 87 through a capacitor 87 to give it a waveshape H as shown in FIG. 5H, pulse I as shown in FIG. 5I is provided at the Q-output of J-K·FF 87. These output pulses from J-K·FF 85, 87 and 86 are applied to the input terminals 77a, 77b and 77c in FIG. 3 through terminals 91a, 91b and 91c, respectively. As understood from the waveshapes of the pulses E, I and G, the pulse E at the terminal 91a, the pulse I at the terminal 91b and the pulse G at the terminal 91c have phases different from each other by $\frac{2}{3}\pi$ radian. When the pulses each having a phase different from the other by $\frac{2}{3}\pi$ radian are applied to the input terminals 77a, 77b and 77c, current corresponding to the amplitude of these pulses flows to the main windings 45a, 45b and 45c, respectively. Because the main windings 45a, 45b and 45c are excited with the 1–2 phase excitation method, as described hereinbefore, the capstan motor 25 rotates one rotation when 48 pulses are applied to the pulse generator 42.

The integrating circuits 78a, 78b and 78c coupled between the input terminal 77a, 77b and 77c and the base of the current amplifying transistors 79a, 79b and 79c, respectively are provided for slowing the rise time and fall time of the pulses applied to the input terminals 77a, 77b and 77c, for the following reason. In the case of usual continuous rotation of the capstan motor 25, there is caused a back electromotive force proportional to the speed of rotation of the capstan motor 25 at the main windings 45a, 45b and 45c. This is AC voltage, the zero potential of which is the DC voltage applied to the power source terminal 59. On the other hand, the pulses applied to the input terminals 77a, 77b and 77c have a short rise time and fall time. When these pulses are directly applied to the current amplifying transistors 79a, 79b and 79c, because the impedance of the main windings 45a, 45b and 45c for the rise and fall portions of these pulses is mainly an inductance component, a very high voltage is induced at the main windings 45a, 45b and 45c and the output transistors 58a, 58b and 58c are damaged by this induced voltage. If a diode is connected between the collector of the output transistors 58a, 58b and 58c and the power source terminal 59 in order to protect these output transistors against the above induced voltage, the back electromotive force described above is applied to this diode and current flows therethrough, and thus the capstan motor 25 can not rotate continuously. Therefore, according to the invention, the above mentioned induced voltage is reduced by making the rise and fall of the pulses applied to the input terminals 77a, 77b and 77c slow by means of the integrating circuits 78a, 78b and 78c. It is noted that the fact that the output transistors 58a, 58b and 58c have no saturation operation is one of the reasons why the induced voltage can be lowered in this way by suppressing the abrupt change of the pulse at the input.

The emitter resistors 65a, 65b and 65c are inserted in the emitter circuits of the output transistors 58a, 58b and 58c for the following reason. When rotating the capstan motor by the pulses from the pulse generator 42, because the main windings 45a, 45b and 45c are excited by a 1-2 phase excitation method, as described hereinbefore, there exists a time when current flows to two main windings (45a and 45b, 45b and 45a, or 45c and 45a) at the same time. On the other hand, the current flowing to the main windings 45a, 45b and 45c is according to the pulse voltage applied to the output transistors 58a, 58b and 58c and the emitter resistors 65a, 65b and 65c. And, similarly to the case of using the capstan motor 25 as a conventional brushless DC motor, a three-phase differential circuit is formed by the connection of the emitter of the output transistors 58a, 58b and 58c with a common resistor for the emitter resistors 65a, 65b and 65c. Therefore, when the currents flow at the same time to the above mentioned two main windings and when the amplitudes of the pulses applied to the input terminals 77a, 77b and 77c differ slightly from each other, the currents flowing to the two main windings become very different from each other. In the extreme case, the current flows only to one main winding, and so the step rotation angle of the capstan motor 25 changes about one step. For the above reason, the emitter resistors 65a, 65b and 65c are provided for each of the output transistors 58a, 58b and 58c. The value of the feedback resistors 66a, 66b and 66c are sufficiently large compared with that of the emitter resistors 65a, 65b and 65c.

Thus, the rotation speed of the capstan motor 25 is controlled, and the driving force of the motor is transmitted to a capstan 94 having a flywheel 93 through a belt 92 and the magnetic tape 8 is moved at the appointed speed.

There will now be described the operation in the case of the standard I-type referred to at the beginning of this specification, where the standard tape moving speed is 19.05 cm/sec. In this case, the speed of rotation of the capstan motor is set at 1350 rpm, and the number of the gear teeth of the gear 70 is 192. On the other hand, the frequency of the signal from the wave-shaping circuit 10 is set at 30 Hz, the same as the frame frequency of the video signal. At the rotation speed of 1350 rpm (22.5 rotations in one second) of the capstan motor 25, the frequency of the signal provided from the magnetic head 71 becomes 4320 Hz (192×1350/60). This signal is applied to the ½ divider 28 and 1/9 divider 29 and is supplied from the selection circuit 30 at a frequency of 240 Hz, and further the frequency is divided to 120 Hz through the bi-stable multivibrator 31. The second output having frequency of 120 Hz from the bi-stable multivibrator 31 is changed to a frequency of 60 Hz by the ½ divider 35. This frequency is two times the frequency (30 Hz) of the signal from the wave-shaping circuit described above. When the tape moving speed is 1/9 of the standard tape moving speed, the signal from the ½ divider 28 is provided from the selection circuit 30. When the tape moving speed is 1/18 of the standard tape moving speed, the signal from the amplifier 27 is provided from the selection circuit 30. Accordingly, the frequency of the signal from the selection circuit 30 becomes constant regardless of the moving speed of the magnetic tape 8. The speed of rotation of the capstan motor 25 for the tape moving speed of 1/9 and 1/18 of 19.05 cm/sec is 150 rpm and 75 rpm, respectively.

On the other hand, the conditions when the capstan motor 25 is rotated by the pulses from the pulse generator 42 are as follows. As described hereinbefore, the capstan motor 25 rotates one rotation when the number of the pulses applied to the pulse generator 42 is 48. Therefore, in the case when the tape moving speed is 1/36 of the standard tape moving speed, a signal having a frequency of 30 Hz from the wave-shaping circuit 9 is provided from the selection circuit 41. Then, the rotation speed of the capstan motor 25 becomes 37.5 rpm (30 Hz×60 sec/48 pulses=37.5 rpm). When the moving speed of the magnetic tape 8 is 1/72 of the standard tape moving speed, the selection circuit is connected to the ½ divider 40. Therefore, the tape moving speed during the time while one magnetic track is formed on the magnetic tape 8 becomes constant regardless of the moving speed of the magnetic tape 8, and so the length of movement of the magnetic tape 8 necessary for one track becomes the same. That is, when the usual tape moving speed is 19.05 cm/sec and the video signal has 60 fields for one second, as described hereinbefore, that length becomes 3.175 mm (=190.5/60).

On the other hand, when the capstan motor 25 is driven by the pulses from the pulse generator 42 and one magnetic track is formed, for example, at each 72 fields, the frequency of the signal applied to the pulse generator 42 is 15 Hz (15 pulses per second) and the time necessary for forming one magnetic track is that for 72 fields (i.e. 72/60=1.2 second). Therefore, the number of pulses to be applied to the pulse generator 42 required for moving the tape a length corresponding to one track, i.e. 3.175 mm is 18 pulses. That is, in order to move the magnetic tape the correct length corresponding to one track, the capstan motor 25 is stopped when 18 pulses being applied to the pulse generator 42 have been counted. Further, in order to make the magnetic heads 7 and 7' correctly scan the track on the tape 8 when the tape is stopped, $1/\beta$ ($\beta$ being a positive integer) of 18 pulses, such as 9 or 6 pulses, being applied to the pulse generator 42 are counted and then the capstan motor 25 is stopped, as described hereinafter. The number of pulses to be applied to the pulse generator 42 for moving the tape a length corresponding to one track is 18 as described above, but the case when the tape moving in a way other than the intermittent moving for reproducing only one track is changed to the intermittent moving for reproducing only one track must be considered. In this case, although the tape 8 is stopped, the position where the tape 8 is stopped is the problem. It is desirable that the tape 8 be at the position where the magnetic heads 7 and 7' correctly scan one track on the tape 8. However, if the tape 8 is stopped at a position where the head 7 and 7' scan only a side edge of one track or two tracks at the same time, degradation of S/N ratio or beat noise in the reproduced image occurs, as described hereinbefore. In such a case, by further moving the magnetic tape 8 a length shorter than the length corresponding to one track, it becomes possible to make the heads 7 and 7' correctly scan just one track on the tape 8. Further, when the number of the pulses to be applied to the pulse generator 42 in this case is, for example, 6 pulses, i.e. ⅓ of the pulses (18 pulses) for moving the tape a length corresponding to one track, the tape can be moved a length corresponding to one track by repeating the operation of applying 6 pulses and the desired image can be provided. Therefore, if the operation which provides the best image is memorized, the best image can be easily selected. In addition, when the tape 8 is moved a length corresponding to just one track in order to prevent the problem such as over tension and beat noise as described hereinbefore, the output pulse from the wave-shaping circuit 10 is not applied to the pulse generator 42 but another circuit is provided for applying the pulse thereto. This other circuit is the predetermined number pulse generator 122 illustrated in FIG. 6.

Figure 7L:
FIGS. 7L–7Z' are waveforms of pulses for explaining the operation of the circuit of FIG. 6.
Figure 7M:
Figure 7N:
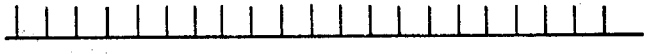

Next will be described an embodiment of a circuit for moving the tape a length corresponding to one track, reference being made to FIGS. 6 and 7L to 7Z'. When a trigger pulse L as shown in FIG. 7L for moving the magnetic tape 8 a length corresponding to one track is applied to a terminal 95 shown in FIG. 6, this pulse is provided to one of two set input terminals of an R–S flip-flop circuit (hereinafter abbreviated to R–S·FF) to set the flip-flop circuit. The output of the R–S·FF 96 is connected to a gate circuit 97, which is opened by the output pulse M therefrom, the pulse being as shown in FIG. 7M. Also, an output of a voltage-controlled oscillator 98 is amplified by an amplifier 99 and supplied to the gate circuit 97, the output having a waveform N as shown in FIG. 7N. The output of the voltage-controlled oscillator 98 is thus applied to a counter 100 through the amplifier 99 and gate circuit. The output of the gate circuit 97 is also applied to the pulse generator 42, the details of which are described in connection with FIG. 4, through the selection circuit 41. The counter 100 is a 1/6 divider composed of ⅓ divider made up of two J–K·FF 101 and 102 and a ½ divider constituted by a J–K·FF 103 and the operations thereof are the same as those of the ⅓ divider made up of the J–K·FF 83 and 84 and the ½ divider constituted by the J–K·FF 85 which form part of the pulse generator 42. Therefore, the counter 100 can be formed by using a part of the pulse generator 42. This is because the capstan motor 25 is driven in three-phases and so the ⅓ divider is necessary in order to generate the driving pulses, and further the number of pulses to be applied to the pulse generator for moving the tape a length corresponding to one track is 18, i.e. $3\times\beta$ ($\beta$ being an integer) according to the invention.

Figure 7O:
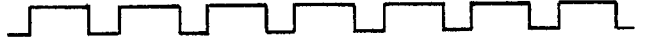
Figure 7P:
Figure 7U:

The waveforms of the Q-output of the J–K·FF 102 and the Q-output and the Q-output of the J–K·FF 103 are waveforms O, P and U, shown respectively in FIGS. 7O, 7P and 7U. The output of the counter 100 is connected to a counter 106 that is a ⅓ divider formed by two J–K·FF 103 and 105. The output of the counter 106 is connected to a reset terminal of the R–S·FF 96 through a differentiation circuit 107. The other outputs of the counters 100 and 106 are connected to an integration circuit 111 through a gate 110 composed of NAND gate 108 and AND gate 109, and the output of the integration circuit 111 is connected to the voltage controlled oscillator 98 through a gate 112. When the tape 8 is moved a length corresponding to one track, by the operation of the selection circuit 41 the output pulse from the wave-forming circuit 10 is not provided to the pulse generator 42, and the circuit of FIG. 6 operates as follows.

Figure 7V:
Figure 7W:
Figure 7X:
Figure 7Y:
Figure 7Z:
Figure 7L:
Figure 7M:
Figure 7Z:
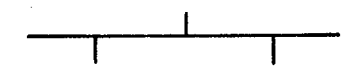

In the circuit configuration as described above, a manual switching means (not shown) is used to trigger either terminal 95 or terminal 113 with trigger pulses L or L', respectively. When the trigger pulse L is applied to the terminal 95, the R–S·FF 96 is set and the output M therefrom opens the gate 97. Then, the output pulse N of the amplifier 99 is provided to the counter 100, and when the number of the pulses applied to the counter 100 and counter 106 becomes 18, a negative pulse Z, as shown in FIG. 7Z, is produced at the output of the differentiation circuit 107 connected to the Q-output (which is the waveform W shown in FIG. 7W) of the J–K·FF 105 of the counter 106 and the R–S·FF 96 is reset. In this process, for output of the gate 110 having the inputs of Q-output pulse U, shown in FIG. 7U, of the J–K·FF 103 and the Q-output pulse V, shown in FIG. 7V, of the J–K·FF 105 changes as shown by waveform X shown in FIG. 7X according to the number of the pulses N applied to the counter 100, and the output pulse X of the gate 110 is integrated by the integration circuit 111. On the other hand, the Q-output pulse V of the J–K·FF 105 is also applied to the integration circuit 111. Therefore, when the pulse N is applied to the counter 100, a positive voltage is provided at the output of the integration circuit and when a certain number of pulses (12 pulses in the case of the present invention) have been applied to the counter 100, the output voltage thereof returns to the original state, as shown by waveform Y shown in FIG. 7Y.

The integration circuit 111 is a charging circuit having a charging time constant comparatively larger than the period of the output pulse X of the gate 110, and so even when the output pulse X of the gate 110 disappears, the voltage charged into this charging circuit can be held. Further, the voltage charged in this charging circuit is discharged when the Q-output pulse V of the J–K·FF 105 disappears. The output voltage Y of the integration circuit 111 is changed as described above and it is applied to the voltage-controlled oscillator 98 through the gate 112. Therefore, the frequency of the voltage-controlled oscillator 98 changes according to the output voltage Y of the integration circuit 111. It is a low oscillation frequency when the trigger pulse L is applied, and the frequency becomes gradually higher and then returns to the original oscillation frequency. (The waveforms in FIGS. 7L–7Z' are all shown for the same interval in order to make it easy to see the period of the waveform.) The reason why the oscillation frequency of the voltage-controlled oscillator 98 is changed as described above is to prevent an over tension in the tape 8 by slowing the tape moving speed at start of movement of the tape as described hereinbefore, and at the same time to increase the tape moving speed during the time when the heads 7 and 7' scan two tracks so as to shorten the time during which the image having the noise as described hereinbefore is reproduced. According to the operation as described above, when the trigger pulse L is applied to the terminal 95, 18 pulses are provided at the terminal 88, and the magnetic tape is moved a length corresponding to one track (=3.175 mm) by the capstan motor 25 and is then stopped.

There is provided a selecting means for performing an operation of moving the magnetic tape by the length of $1/\beta$ (e.g. $\frac{1}{2}$ or $\frac{1}{3}$) of the length corresponding to one track. This selecting means is formed by a gate 115 which is positioned between the counter 100 and the differentiation circuit 107 and switched by the output of the R-S·FF 114 connected to the input terminal 113, as shown in FIG. 6.

For moving the magnetic tape 8 just $\frac{1}{3}$ of the length corresponding to one track, the operation provides 6 pulses to the capstan motor 25 by means of only the counter 100. When a trigger pulse L' as shown in FIG. 7L' is applied to a terminal 113 from a manual switching means (not shown), the pulse L' sets the R-S·FF 96 and another R-S·FF 114. Therefore, the gate 97 is opened by the output M' of the R-S·FF 96 and the pulse N of the amplifier 99 is applied to the counter 100. As the R-S·FF 114 is set at this time, the output thereof rests the counter 106 and also opens the gate 115, so that the output pulse P of the counter 100 is directly provided to the differentiation circuit 107. Further, the output of the R-S·FF 114 closes the gate 112, so that the output voltage of the integration circuit 111 is not provided to the voltage-controlled oscillation circuit 98. Therefore, the output signal of the voltage-controlled oscillation circuit having a constant oscillation frequency is provided to the counter through the amplifier 99 and the gate 97. When the number of the pulses N applied to the counter 100 becomes 6, a differentiated pulse Z' as shown in FIG. 7Z', of the Q-output of the J-K·FF 103 is provided at the output of the differentiation circuit 107 and the R-S·FF 96 is reset by this pulse Z'. According to the above described arrangement, in response to the trigger pulse applied to the terminal 113, the capstan motor 25 moves the magnetic tape 8 by $\frac{1}{3}$ of the length corresponding to one track (3.175 mm) and stops. When the trigger pulse L is applied to the terminal 95, the R-S·FF 114 is reset by this trigger pulse L. When the capstan motor 25 stops, the input terminals 77a, 77b and 77c of the motor driving circuit are connected to the J-K·FF 85, 86 and 87, respectively, as described hereinbefore referring to FIGS. 3 and 4, and even when the input pulse at the terminal 88 disappears, the J-K·FF 85, 86 and 87 hold the state resulting from the input pulse being applied. Therefore, even when the input pulse at the terminal 88 disappears, a certain current flows to the main windings 45a, 45b and 45c of the capstan motor 25, and according to the pulling force due to this current and the magnet 47 in FIG. 2 the capstan motor 25 remains in the stopped state and a certain torque is maintained therein to hold it there.

By the method as described hereinbefore, the magnetic tape can be moved exactly a length corresponding to one track of $\frac{1}{3}$ of that length. When the video signal recorded on the magnetic tape 8 by such a method is reproduced, the motor 13 for rotating the magnetic heads 7 and 7' is rotated at the same rotating speed as that during recording the video signal. The signal reproduced by the heads 7 and 7' is processed by the same method as that for a conventional magnetic recording and reproducing device. In order to move the magnetic tape 8 at the same moving speed as that used for recording, the output of an oscillation circuit having an oscillation frequency of 30 Hz is employed instead of the output signal of the wave-shaping circuit 10.

Although there has been described hereinbefore the case of recording the video signal at a constant period intermittently and reproducing the thus recorded video signal, according to the invention it is possible to move the magnetic tape 8 so as to record the video signal at any desired time and to form the magnetic tracks at the same interval. This is made possible by combining circuits illustrated in FIGS. 1, 6 and 8. Referring to FIG. 8 which shows a preferred embodiment of intermittent recording controller 121, the output of the rotation phase detector 12 shown in FIG. 1 is connected to the reset input of R-S·FF 118 and the output of the R-S·FF 118 is supplied to the gate pulse generator 24 in FIG. 1 through a gate circuit 117. Further, the output of the gate pulse generator 24 is connected to the gate circuit 4 as described in connection with FIG. 1 and also connected to the terminal 95 shown in FIG. 6. The operation of the gate circuit 117 is controlled by the output pulse of the R-S·FF (appearing at an output terminal 123 of the R-S·FF 96) 96 of FIG. 6. In such a configuration combining circuits illustrated in FIGS. 1, 6 and 8, when the R-S·FF 118 is set at a desired time by a pulse from a terminal 116 produced by a manual switching means (not shown), it is reset by the pulse from the rotation phase detector 12. The output pulse of the R-S·FF 118 at this time triggers the pulse generator 24 through the gate 117, and thus the gate 4 is opened for a certain time and a magnetic track is formed on the tape 8. Then, the R-S·FF 96 is set by the output of the pulse generator 24 for closing the gate 4 through the terminal 95, and thus the capstan motor 25 is rotated by an appointed amount. The gate circuit 117 is provided in order to prevent the output pulse of the R-S·FF 118 from being supplied to the pulse generator 24 during the time while the R-S·FF 96 is set, i.e. while the capstan motor 25 is rotated.

What is claimed is:

1. A magnetic recording and reproducing device in which a video signal is recorded intermittently on an oblique magnetic track formed on a magnetic tape by a rotary magnetic head, and reproduced therefrom, said device comprising: a tape driving capstan rotatable for moving the magnetic tape a predetermined constant distance for each rotation thereof; a pulse motor for rotating said capstan; driving means coupled to said motor for rotating said motor; pulse supplying means coupled to said driving means having input pulses applied thereto for supplying to said driving means output pulses corresponding to the number of said input pulses applied to said pulse supplying means for driving said driving means for rotating said motor an amount corresponding to the number of said input pulses, wherein the number of said input pulses corresponding to the number of said output pulses for driving said driving means to rotate said motor by an amount corresponding to one track of said video signal is a predetermined constant $\alpha$, and the number of said input pulses for rotation of said motor by an amount corresponding to $1/\beta$ of one track of said video signal is a predetermined constant $\alpha/\beta$, where $\alpha$ is a positive integer other than a prime number and $\beta$ is a positive integer other than 1; a first pulse generating means for generating input pulses to be applied to said pulse supplying means; a first gating means connected between said first pulse generating means and said pulse supplying means for gating said input pulses to said pulse supplying means; pulse counting means coupled to said first pulse generating means and said first gating means and including a first pulse counter for counting said input pulses for producing one pulse every time said first pulse counter counts $\alpha/\beta$ pulses, and a second pulse counter coupled to said first pulse counter for receiving pulses produced from said first pulse counter and for counting the received pulses to produce one pulse after said second pulse counter counts $\beta$ pulses, and selecting means coupled to said pulse counting means and to said first gating means for manually selecting the operation of said pulse counting means for opening said first gating means only during a time $\alpha/\beta$ number of said input pulses are counted by said first pulse counter so as to apply only $\alpha/\beta$ number of said input pulses to said pulse supplying means, or opening said first gating means only during a time $\beta$ number of the pulses from said first pulse counter are counted by said pulse counter so as to apply only $\alpha$ number of said input pulses to said pulse supplying means.

2. A magnetic recording and reproducing device according to claim 1 wherein said selecting means is a second gating means, and a first R-S flip-flop circuit connected to said first gating means and a second R-S flip-flop circuit connected to said second gating means, input means connected to said flip-flop circuits for supplying a trigger pulse for operation of counting $\alpha/\beta$ pulses to said first and second R-S flip-flop circuits for setting them at the same time, said second pulse counter is reset and said second gating means is opened by an output of said second flip-flop circuit, and further input means connected to said flip-flop circuits for supplying a further trigger pulse for operation of counting $\alpha$ pulses to said first and second R-S flip-flop circuits for setting said first R-S flip-flop circuit and resetting said second R-S flip-flop circuit.

3. A magnetic recording and reproducing device according to claim 2 wherein said device further comprises a rotation phase detector for generating a pulse corresponding to the rotation phase of said rotary magnetic head, a third R-S flip-flop circuit having a set input terminal for being manually set and a reset terminal connected to said rotation phase detector, a fourth gating means coupled to said first R-S flip-flop circuit and receiving the output of said third R-S flip-flop circuit for inhibiting the passage of the output of said third R-S flip-flop circuit while said first R-S flip-flop circuit is set, and a second pulse generating means connected to said fourth gating means and said first R-S flip-flop circuit for being triggered upon reception of the reset output of said third R-S flip-flop circuit and generating pulses during a time corresponding to about one field of the video signal, and for setting said first R-S flip-flop circuit by the end pulse from said second pulse generating means.

4. A magnetic recording and reproducing device according to claim 2 wherein said device further comprises an output means coupled to said pulse counting means for providing a counted pulse from said pulse counting means, an integrating means coupled to said output means for integrating the output pulses from said output means, and a voltage-controlled oscillator which is connected to said integrating means and the oscillation frequency of which is changed according to the output voltage of said integrating means for being increased gradually until the number of pulses counted by said pulse counting means arrives at a predetermined number and to be returned to the original frequency thereafter, whereby while said rotary magnetic head scans two magnetic tracks at the same time, said motor for moving said magnetic tape is rotated at a speed of rotation higher than the speed when said rotary magnetic head scans just one magnetic track.

5. A magnetic recording and reproducing device according to claim 4 wherein said device further comprises a third gating means connected between said integrating means and said voltage-controlled oscillator and connected to said second R-S flip-flop circuit for closing said third gating means so as to inhibit application of the output voltage of said integrating means to said voltage-controlled oscillator, input means connected to said flip-flop circuits for supplying a trigger pulse for the operation of counting $\alpha$ pulses so as to move said magnetic tape a length corresponding to one track to said first R-S flip-flop circuit for setting said first flip-flop circuit and to said second R-S flip-flop circuit for resetting said second flip-flop circuit, and further input means connected to said flip-flop circuits for supplying a further trigger pulse for the operation of counting $\alpha/\beta$ pulses so as to move said magnetic tape a length of $1/\beta$ of the length corresponding to one track to said first and second flip-flop circuits for setting them at the same time.

* * * * *